United States Patent [19]
Lettieri et al.

[11] 3,746,839
[45] July 17, 1973

[54] ACCUMULATOR FOR A KEY ENTRY DEVICE

[75] Inventors: John Lettieri, Woodstock, N.Y.; Roger H. E. Pett, Scarborough, Ontario, Canada

[73] Assignee: International Business Machines Corporation, Armonk, N.Y.

[22] Filed: Oct. 29, 1971

[21] Appl. No.: 193,827

[52] U.S. Cl......... 235/61.6 R, 235/61.8 R, 235/168, 235/174, 235/176
[51] Int. Cl.......... G06f 5/02, G06f 7/50, G06k 1/00
[58] Field of Search........................ 235/174, 61.8 R, 235/61.1, 61.6 M, 61.6 R, 168, 176; 340/347 DD

[56] References Cited

UNITED STATES PATENTS

| | | | |
|---|---|---|---|
| 3,643,077 | 2/1972 | Griggs et al. | 235/168 X |
| 3,191,014 | 6/1965 | Roth et al. | 235/174 X |
| 3,597,592 | 8/1971 | Graves et al. | 235/61.1 X |
| 2,780,408 | 2/1957 | Grosman | 235/174 |

*Primary Examiner*—Maynard R. Wilbur
*Assistant Examiner*—Thomas J. Sloyan
*Attorney*—James E. Murray et al.

[57] ABSTRACT

This specification describes an accumulator for a key entry device which has a shift register buffer memory that holds a character entered from a keyboard. The accumulator performs computation on the data on punch cards used by the key entry device. These computations can include the addition or subtraction of data in two or more numeric fields to be punched on the same card to provide a total that is punched out in a third numeric field on that same card or can include the computation of a running or hash total of the same numeric field on a number of different cards forming a group or batch of cards. The accumulator comprises a counter for converting the ten numeric bits of the serial Hollerith code used in punching data onto cards to four parallel BCD bits used in performing addition or subtraction with the data, a buffer for storing the accumulated total in BCD and a plurality of single bit adders and registers for performing the addition on data to be added to or subtracted from the accumulated total.

2 Claims, 9 Drawing Figures

INVENTORS
JOHN LETTIERI
ROGER H. E. PETT

BY James E. Murray

ATTORNEY

ACCUMULATOR FOR A KEY ENTRY DEVICE

CROSS REFERENCE TO RELATED APPLICATIONS

1. Application entitled "Word Backspace Circuit For Key Entry Device" inventor — J. Lettieri, Ser. No. 155,449, filed June 22, 1971, assigned to the same assignee as the present invention.
2. Application entitled "Verify Read Control on 129 Card Data Recorder", inventors — R. B. Battistoni, J. Lettieri, D. L. Pierce and W. J. Weikel, Ser. No. 193,899, filed Oct. 29, 1971, assigned to the same assignee as the present invention.
3. Application entitled "Production Statistics," inventors — J. Lettieri and R. Pett, Ser. No. 193,828 filed Oct. 29, 1971, assigned to the same assignee as the present invention.
4. Application entitled "Step Motor and Controls For Non-oscillating Punch/Read Positioning of 80-Column Record Cards," inventors — F. T. Kendall, D. L. Pierce and W. J. Weikel, Ser. No. 158,343, filed June 30, 1971, assigned to the same assignee as the present invention.
5. Application entitled "Left Zero Circuit For Key Entry Device," inventors — R. B. Battistoni, V. Ferreri, G. A. Gates, J. Lettieri, Ser. No. 187,479 filed Oct. 7, 1971, assigned to the same assignee as the present invention.

BACKGROUND OF THE INVENTION

The present invention relates to a key entry device having a shift register, buffer memories and, more particularly, to a circuit for performing addition and subtraction in such a key entry device.

In the entry of data onto a card with a keypunch device it becomes very desirable that numeric fields of data be added or subtracted. For instance, on a card containing a man's payroll you may wish to be able to list a man's gross salary, federal, state and social security tax deductions and then be able to subtract the federal, state and social security taxes from the gross salary to compute the net salary. Another type of computation you may wish to perform is to total the gross salaries on all the cards to provide a figure representing the total company payroll. It can be seen then that it becomes very desirable to have a computational function on a key entry device. However, it is important that such a function be inexpensive, easy to operate and not interfere with the operation of the key entry device in performing its basic function of punching the data onto a card.

BRIEF DESCRIPTION OF THE INVENTION

Therefore, in accordance with the present invention a computational function is provided for a key entry device. This computational function is performed by what is called an accumulator. The computations performed by the accumulator include the addition or subtraction of data in two or more numeric fields to be punched on the same card to provide a total that is punched out in a third numeric field on that same card also and the computation of a running or hash total of the same numeric field on a number of different cards for a group or batch of cards. The accumulator comprises a counter for converting between the numeric bits of the serial Hollerith code used in punching data onto cards to four parallel BCD bits used in performing addition and subtraction with the data, a buffer for storing the accumulated total in BCD and a plurality of single bit adders and registers for performing the addition on data to be added to or subtracted from the accumulated total.

Therefore, it is an object of the present invention to provide an accumulating function for the key entry device.

It is another object of the invention to provide an accumulating function for the key entry device that is inexpensive, easy to operate and does not interfere with the running of the key entry device.

DESCRIPTION OF THE DRAWINGS

These and other objects, features and advantages of the invention will be apparent from the following more particular description of the preferred embodiment of the invention as illustrated in the accompanying drawings, of which.

The descriptive terminology used is taken from the IBM Corporation manual "129 Data Recorder" SY22-6871-1 which describes a specific key entry device that uses the accumulator of the drawings.

Figure 1:
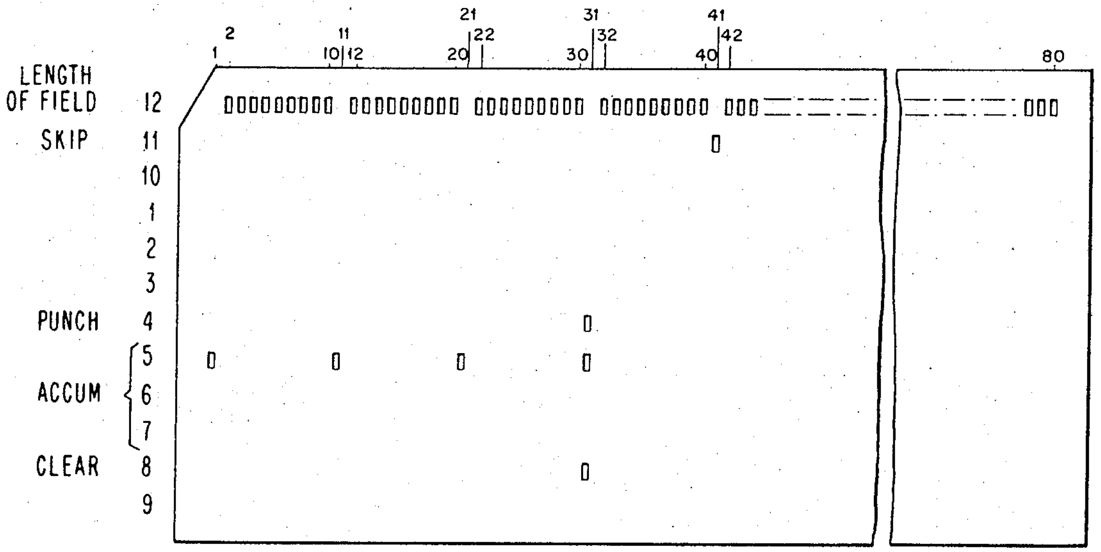
FIG. 1 is of a card for programming a buffered key entry device for performing an accumulating function.
Figure 6:
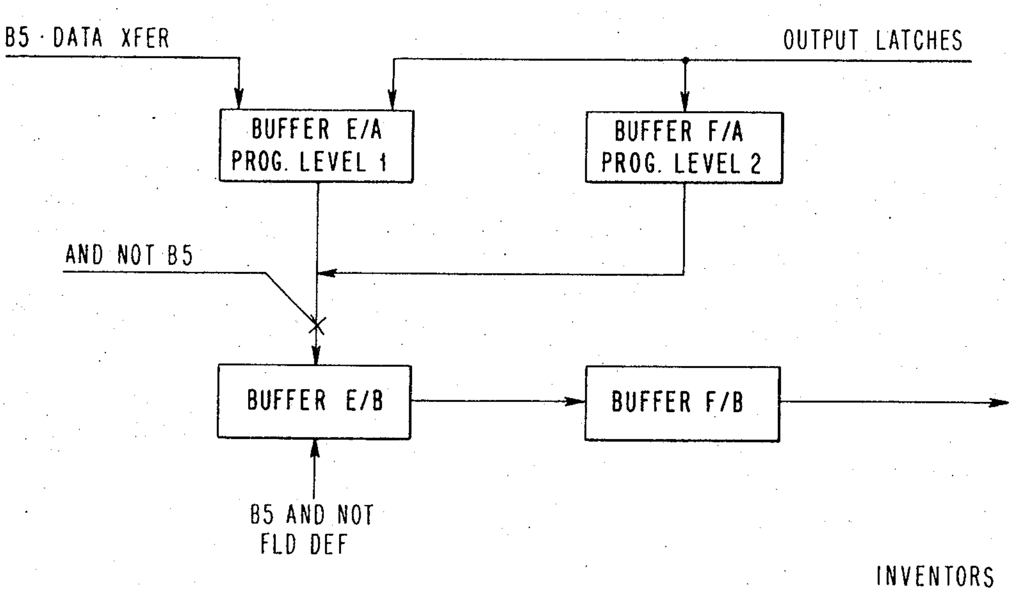
FIG. 6 illustrates the program control arrangement of the accumulator.

Referring now to FIG. 1 of the drawings, a card for programming a particular accumulate function is shown. The program shown on the card is an add function for addressing three numeric fields of data to be punched into a single card and for generating a total in a fourth numeric field to be punched into the same card. The card is a standard punch card with eighty columns of data arranged in twelve rows. In the machine discussed in the referenced manual the data punched in card row 12 defines the length of the numeric field, in card row 11 indicates a skip function, in card row 4 calls for punching out the data stored in the accumulator, in card rows 5, 6 and 7 defines which of the three accumulator stages being used and in card row 8 tells the machine to clear the accumulator at punch out.

Referring back to the particular program to be implemented, the data stored in columns 1 through 10 of the card is to be added to the data stored in both columns 11 through 20 and columns 21 through 30 and then the total is to be punched out on the card in columns 31 through 40. Thereafter the card is to be left clear. As illustrated, column 1 of the program card is punched at row 5 to program the key entry device to place the numerical field starting on column 1 into the first accumulator. Columns 2 through 10 of row 12 are punched to fix the length of the numerical field to be placed in the accumulator. Similarly, there is a punch made in row 5 at columns 11, 21 and 31 and punches made in row 12 at positions 12 through 20 and 22 through 30 to respectively indicate the fields to be accumulated with the data in columns 1 through 10 in the first accumulator and the length of such fields. Thereafter, column 31 is punched in rows 4, 5, 8 and columns 32 through 40 are punched in row 12 so that what is accumulated in the first accumulator is punched out on the card in the numeric field defined by columns 31 through 40 and the data in the first accumulator erased.

This programming card is placed in the key entry machine in the normal manner after having adjusted the program select key so that the card enters the key entry device as a program card as opposed to a card on which work is to be performed. Once the card is placed in the machine the machine becomes programmed to function in a manner defined by the punches on the card and will do so until the machine is reprogrammed by another card.

Figure 2:
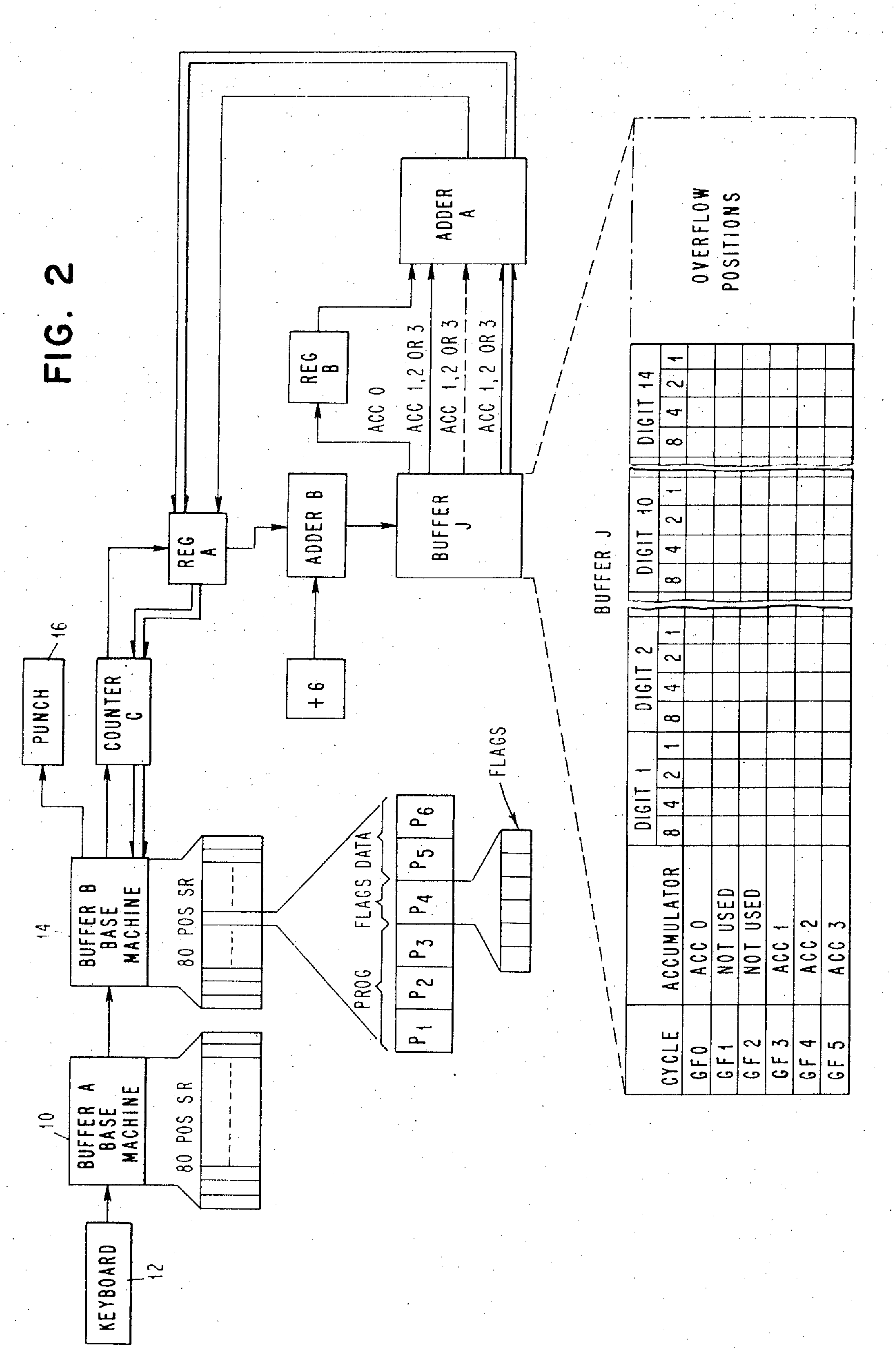
FIG. 2 is of an accumulator in accordance with the present invention.

Referring now to FIG. 2, it can be seen how the key entry device performs an accumulator function in accordance with the present invention. The key entry device contains two buffers. The first buffer 10 receives the data entered on the keyboard 12 and at a later time transfers it to buffer 14 which, at a suitable time, reads the data out into the punch mechanism 16 for punching the cards. The buffers 10 and 14 are each eighty-position buffers whose positions correspond to each of the positions on the card. These buffers are shift register buffers that transfer the data in a serial manner so that the data leaves the buffer one character at a time. The time provided for the writing or reading of data from the buffer is divided into six time periods $P_1$ to $P_6$. Three time periods $P_1$ to $P_3$ are devoted to perform programming functions for the machine so that the two buffers 10 and 14 can store six different programs. Two time periods $P_5$ and $P_6$ are provided to transfer the data signals into the buffers or out of the buffers while the $P_4$ time period is used to provide flags. During this flag period $P_4$ time is allocated to initiating the accumulator function. The accumulator function is performed on the data one character or column at a time while the data is in the B buffer prior to the punching of the data onto a card. During this period of operation the first column in the numeric field is transferred from buffer B to counter C. Counter C converts the ten numeric bits of the twelve-bit serial Hollorith code used in punching data onto cards to four parallel BCD bits used by the accumulator in performing addition and subtraction with the data. The converted data is transferred in parallel to register A which is also a four-bit shift register. The contents of register A are then transferred serially through adder B without change into the accumulate zero (Acc 0) position of buffer J. At an appropriate point in this sequence of loading the first column of data from buffer B into buffer J, the second column in buffer B is similarly started through this data path to the Acc 0 stage of buffer J. Like the buffers A and B, the buffer J is a serial register with the data emerging from the output of buffer J one digit at a time. Thus, after the first numeric field has been placed in accumulator 0, it is transferred in the four-bit BCD groups into the four-bit register B. As four bits appear in register B, they are held there while the corresponding bit positions from accumulators 1, 2 and 3, whichever one is selected to perform the accumulate function, are transferred to adder A. The output of adder A is a pure binary addition of two BCD units. That is, since the BCD numbers are the same as binary numbers except that they don't go beyond 9, the output of adder A is some binary number that can be represented in five bit positions. The circuit that is called adder B receives the output of adder A and adjusts the number from binary back to BCD if the output of adder A is more than 9. For example, if the output of adder A was 1111 for binary 15, the adder B would change this to a 0101 for a BCD 5 and it would supply a one for the next data operation that would operate as a decimal carry. So during an add operation, the serial output of buffer J runs through adder A, adder B, and back into buffer J.

The organization of buffer J is also shown in FIG. 2. The fourteen digits that are marked up in solid lines in the drawing represent the fourteen digits that are available to the user. There are also six overflow positions which are shown in a dashed line. The buffer has four bit positions for each of these twenty decimal positions for the accumulate registers. There are exactly six accumulate registers, but two of these buffer positions are not used. This accounts for the non-use of cycles GF1 and GF2. Each of the remaining G times provides for reading one four-bit BCD digit from the buffer. At GF0 time the four BCD bits of the first digit of accumulator 0 appear at the output of the buffer J. Then at GF3 time, the four BCD bits in the first digit of accumulator 1 appear at the output of buffer J. This sequence continues until all of the bits for digit position 1 appear at the output and then all the bits for position 2 appear at the output, and so on. You can see from the way that the buffer is organized that an add operation is going to consist of first loading register B with four bits from the accumlate 0 or working register and then gating out the corresponding bit position in a selected one of the three other accumulator registers. As the next position is scanned, the next digit position of the working register and the next digit position of the same accumulator will be gated out for adding the next digit. Just one of the accumulators 1, 2 or 3 is read out until the entire buffer for this accumulator has been handled.

When an add operation has been done on one field, the scan in buffer B goes on to the next field and the same operation goes on. When the entire field has been scanned, it is possible to reselect the fields from buffer J and load them into predefined positions in buffer B so that these totals or subtotals will appear on the card when it is punched.

Figure 3A:
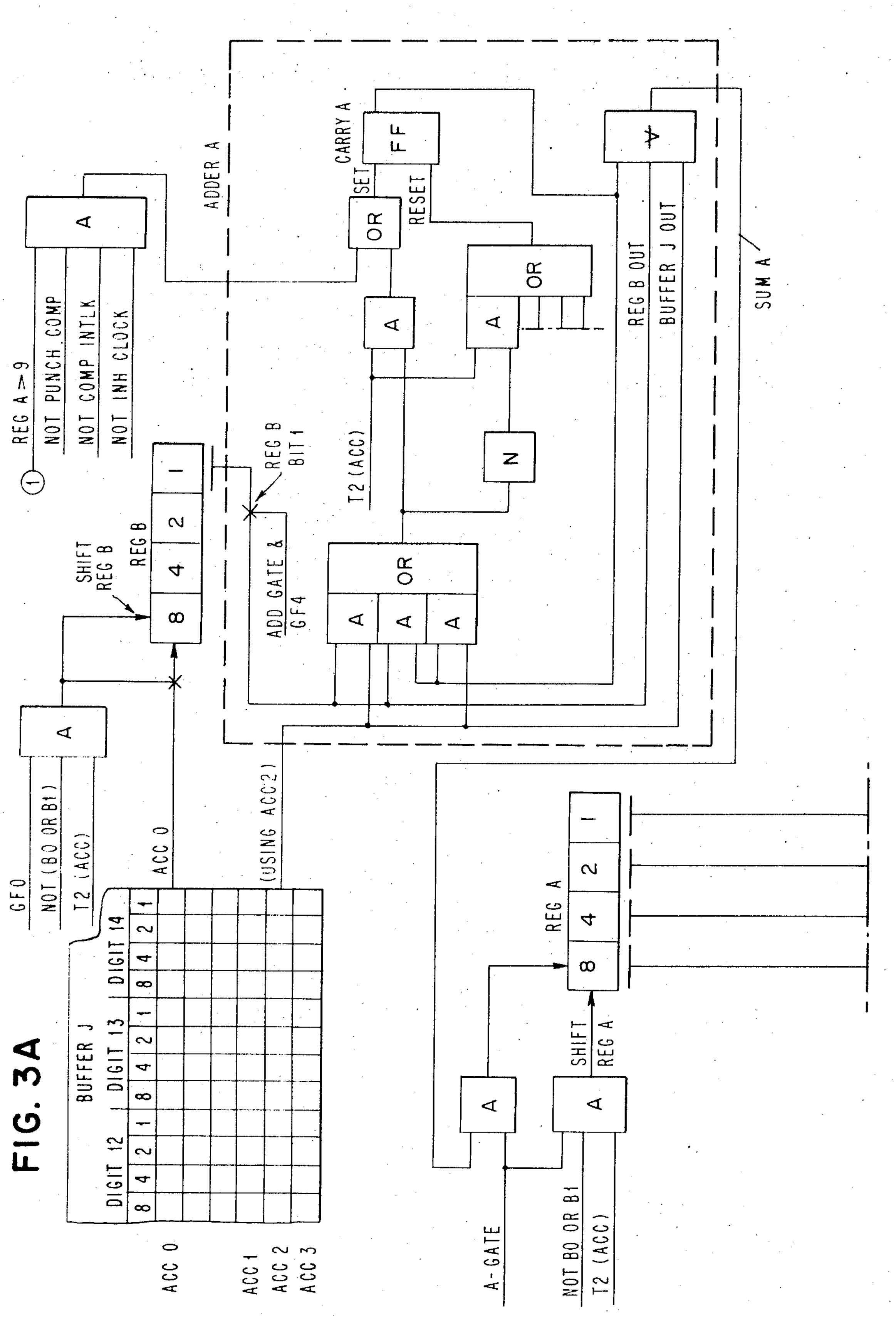
FIGS. 3A and B are of adders for performing the accumulating function.
Figure 3B:
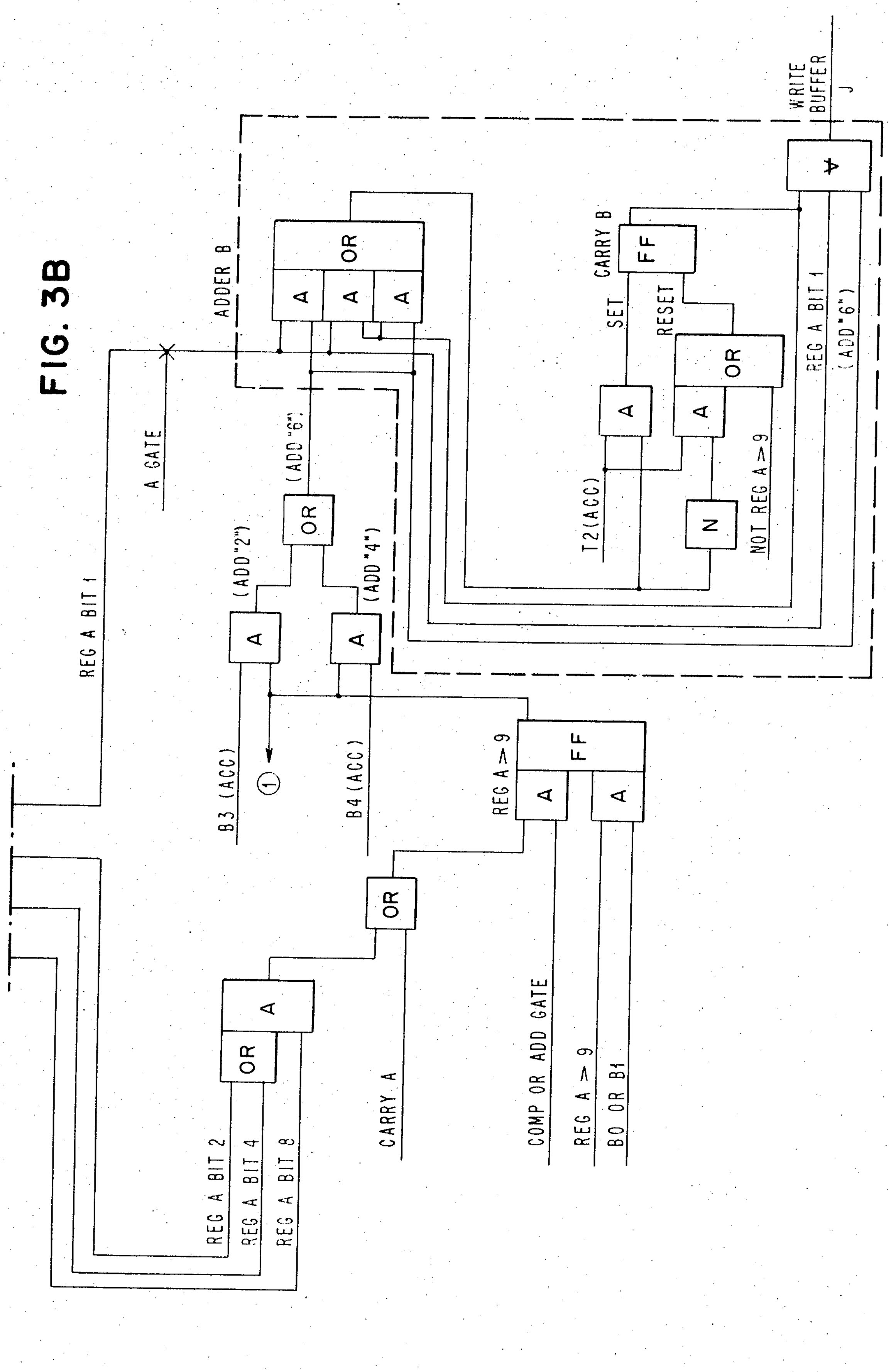

Referring now to FIGS. 3A and B, a description of the adders will be provided. Notice on the two outputs to the right of buffer J in the upper left hand corner of the drawing that there are, in fact, not two outputs from the buffer, but at time GF0 the signals from the working accumulator appear at the serial output and at times GF3, 4 and 5, signals from accumulators 1, 2 and 3 appear at the output. The X at the output on the line Acc 0 represents a gate and the AND circuit that controls this gate has three inputs. GF0 is the timing pulse that signifies that the signals at the output of buffer J are from accumulate register 0. Not (B0 or B1) is a timing signal that blanks out the first two bit positions of each G time in the base machine timing cycle which is used in the accumulate feature. In the accumulate feature, there are only four BCD bits in each G time because of the use of binary coded decimal. In the base machine there are six bit times within a G time that are labeled B0 through B5. Since two of these times are not used during accumulate bit times B0, B1 are blanked out. Therefore, bit time B2 is digit position 1, bit time B3 is digit position 2, bit time B4 is digit position 4 and bit time B5 is digit position 8. T2 is a timing signal that rises for each bit time and thereby strobes the output of the J buffer. As the gate at the input of shift register B is opened during each bit time, data from one four bit BCD digit of accumulator register 0 is shifted into register B. The data in register B is further shifted to the right at a later time so that the four bit positions can each be presented serially at the register position 1 where there is an input to adder A. At that later time the output of buffer J is also applied to the input of adder A. That is, if you were adding to accumulator 2 you would gate the output of the B register at time GF4 because at this time the output of the accumulator 2 appears at the output of buffer J. The adder is conventional. The output of position 1 of register B goes to a gate indicated by an X that is controlled by a signal called "Add Gate." This signal comes on when the output of buffer J is to be added. The Exclusive OR circuit in the lower right hand corner of the dashed box labeled adder A performs the logical sum of the output of buffer J, the output of register B and the output of the carry latch. The Exclusive OR circuit in the low right hand corner of the box labeled adder A, performs the logical sum of the output of buffer J, register B, and output of the carry latch.

The rest of the circuitry is the carry latch for adder A and controls therefor. One input to the carry latch through the OR circuit is from the AND circuit on top of the box. This is a carry in from the preceding decimal position as contrasted with the carry from one binary position to the next within a decimal group. The input register "A greater than 9" (A > 9) is generated in the lower part of the page and signifies that there is such a carry. The other inputs are carries from the same group. These inputs are for setting the latch at the simultaneous occurrence of binary "1's" at the output of any two of buffer J, register B and the flipflop initiated carry A. The output of adder A is transferred serially into register A. The output of adder A and the complement of A gate control the transfer. The line "shift reg A" is controlled by signal T2 which defines the bit time and the signal not (B0,B1) which again blanks out the unused bit times in the G timing cycle.

The object of loading the serial output of adder A into register A is to detect whether the sum of the two BCD digits is greater than 9. Note that actually there is a five-digit register because the carry latch in adder A represents the fifth position. Thus, if the carry latch in adder A is set there is a need to change from binary to BCD and this shows up in the drawing by the input "carry A" to the latch "register A greater than 9." For example, if the sum was 16, register A would have all zeros and by itself would appear to be a good number, but the one in the carry latch would signify that the number in the A register was to be changed and a carry to the next decimal digit position was being produced. If the carry latch in adder A is reset, a number greater than 9 in register A can be detected from the presence of an 8-bit and either a 2 or a 4 and there is straightforward combinatorial logic on these bits to detect this condition and this produces another input to the latch "register A greater than 9."

The rule for converting from binary to BCD is to add 6 to the contents of register A. Register A is fed into adder B in the same way that register B is fed into adder A and the circuits at the output of "register A greater than 9" form the serial BCD digit 6 by producing pulses at time B3 which corresponds to the two position in the BCD group and at time B4 which corresponds to the four position. Add Operation is the same as adder A. Similarly, if the output of adder A is not greater than 9, the carry B latch is reset, the line labeled "add 6" remains at a zero logic level, and the serial output of register A is transmitted via the Exclusive OR circuit into buffer J.

Negative numbers are handled by tens complement arithmetic. Complementing is performed similarly to the addition operations instead of adding the contents of register B to accumulators 1, 2 or 3. Six is added to accumulator 0 until a non-zero digit in accumulator 0 is detected. Five is then added to the remaining digits. The inverse sum of A is then regenerated in the normal manner by register A. The turn on of carry A by register A greater than 9 is inhibited by complement interlock. This complementing procedure is conventional.

Figure 4A:
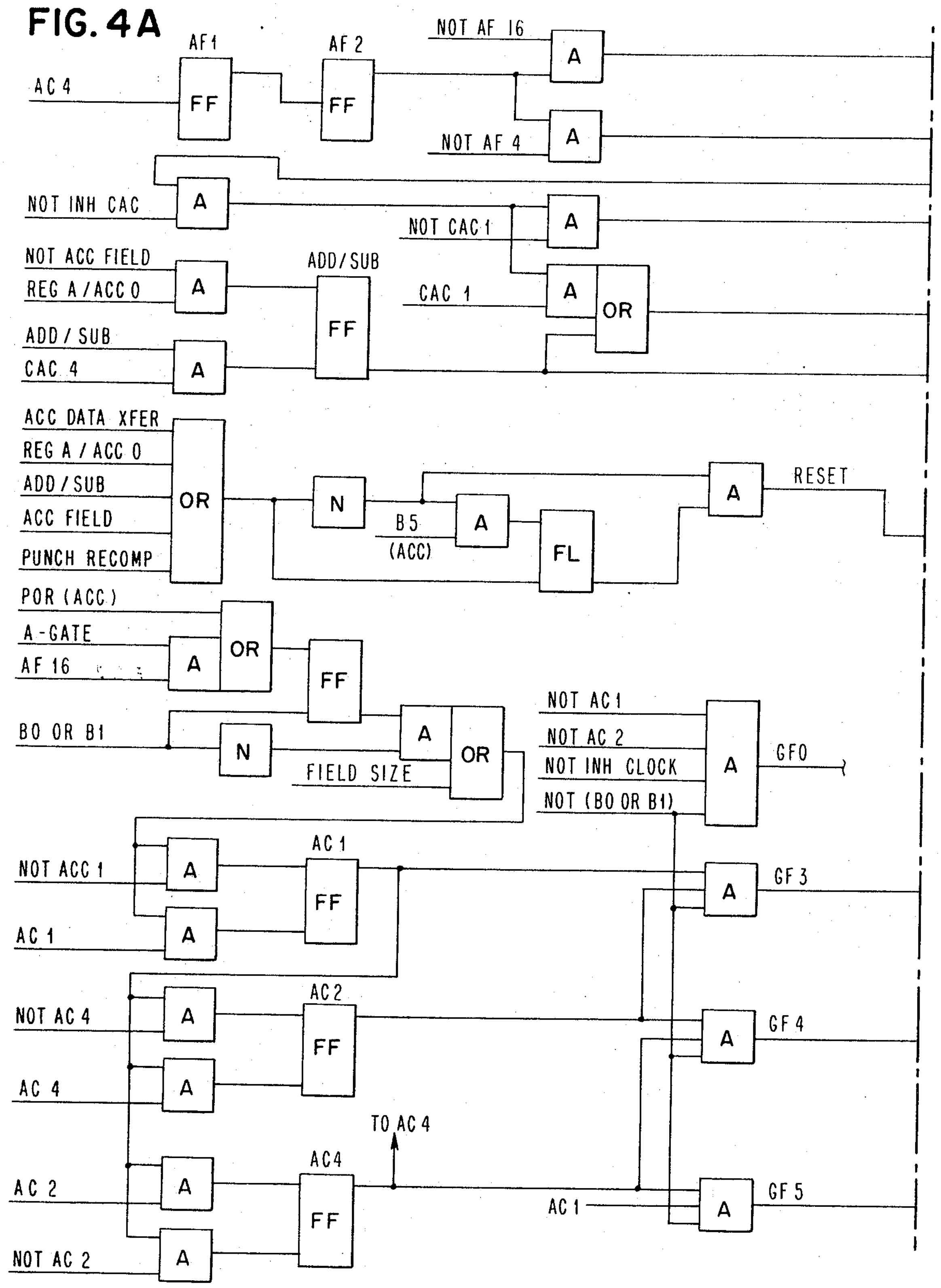
FIGS. 4A and B are of the logic for generating the timing signals for the accumulator.
Figure 5A:
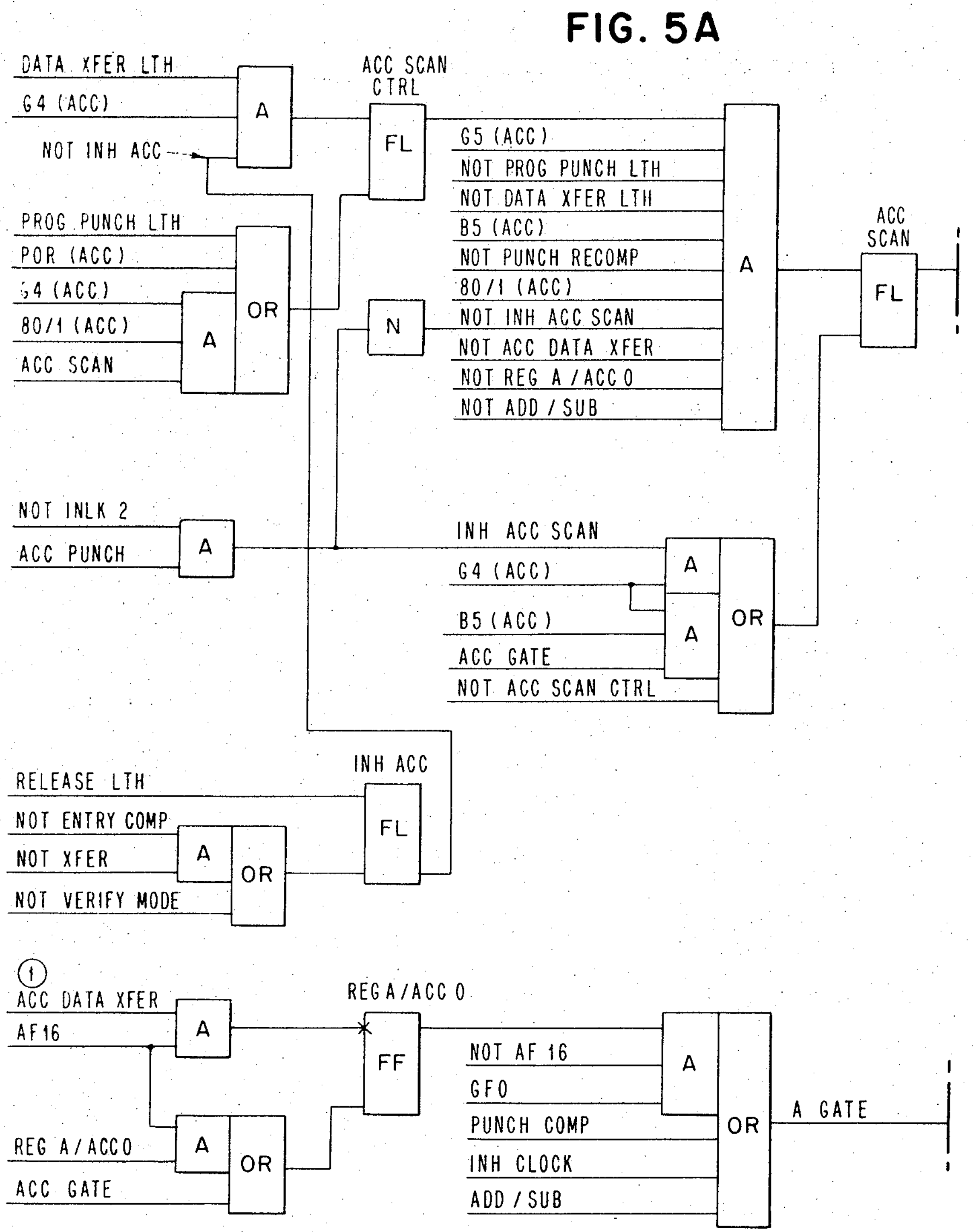
FIGS. 5A and B show the logic for transferring data between the B buffer in the base machine and the accumulate buffers.
Figure 5B:
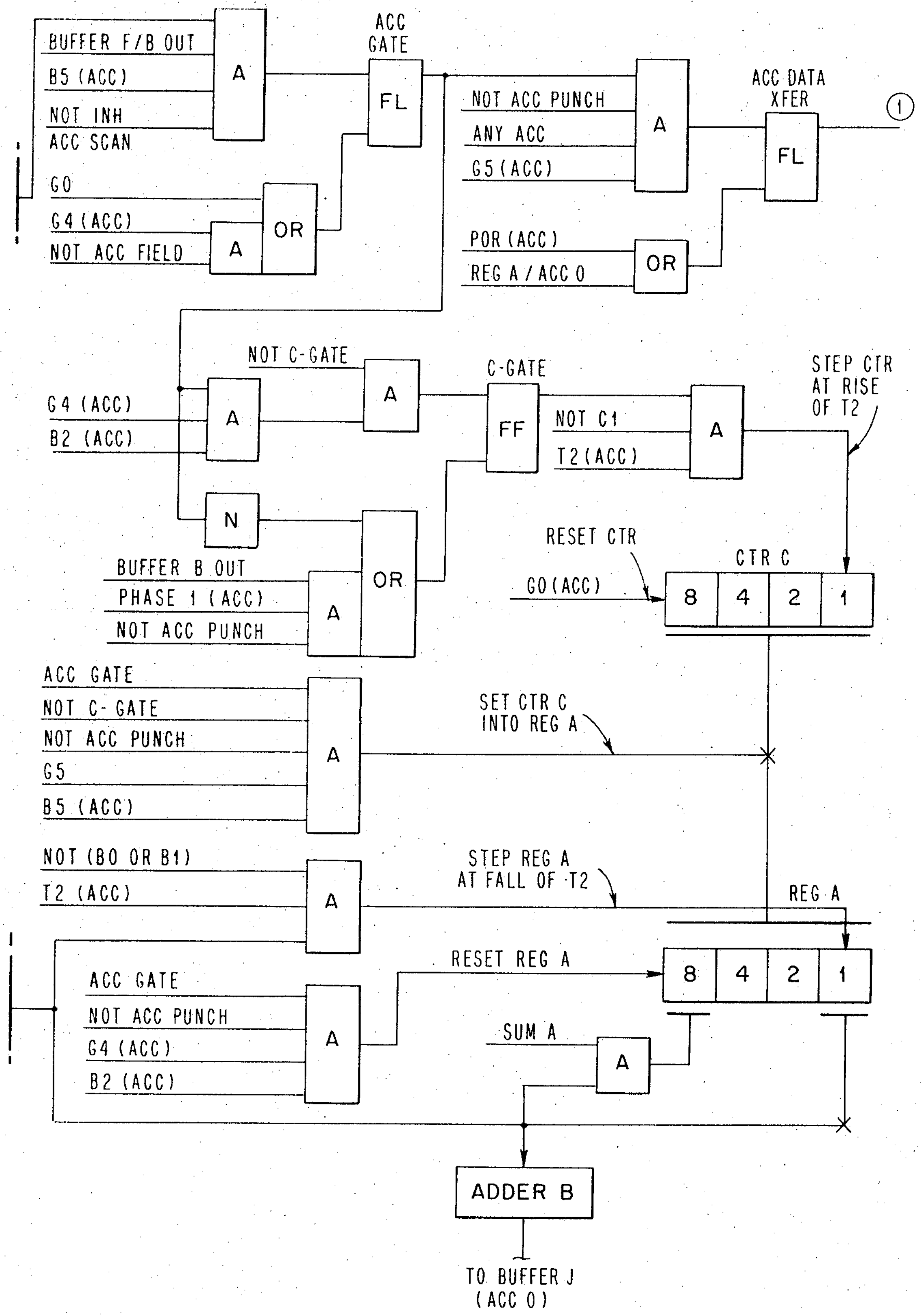

FIGS. 4A and B show the timing circuits for operating the accumulator. The signal "B0 or B1" at the left hand end of the page corresponds to B0 and B1 in the base machine timing cycle. Thus, this signal rises at about the beginning of a G time and it falls at the beginning of data from the J buffer. Latch AC1 is triggered on the fall of the signal Not B0 or B1 so that it turns off in one G time and turns on in the next. The other latches turn on and off in a counting sequence that defines the six G times. The four AND circuits to the right of these three latches decode the latch outputs to generate the timing signals GF2, GF3, GF4, and GF5. The input of these AND circuits "Not B0 or B1" blanks out the unused bit positions in these timing signals. Once in each of these cycles of the six G times a pulse is generated from latch AC4 to trigger the latches shown at the top of the page and labeled AF1, etc. This sequence of latches counts up to 8 in an ordinary binary counting sequence but at 14 (8 plus 4 plus 2) latch AF16 is set. The latches continue cycling until the twentieth count when all of the latches are at zero. The fall of latch AF16 thus identifies digit 01 and is a major timing signal in the circuit. For each of the twenty times that are defined between falls of latch AF16, the AC latches and the GF times scan each of the accumulators twenty times and thus perform a complete addition. As has already been explained, only one of these accumulators is added into at a time and the three latches CAC1 define which of the accumulators is to be added into. The latch Add/Subtract is set after the load operation on accumulator 0 is completed (described later) so that an add operation can begin. With the setting of the Add/Subtract latch, the CAC latches are in a binary zero state and after the cycle of the AF latches whereupon latch AF16 falls, the CAC latches are triggered to binary 1. Thus, these latches continue counting up until the fall of latch CAC4 which ends the sequence by again resetting the Add/Subtract latch and thereby resetting the CAC triggers. Directly below the CAC triggers in the drawing are the decoders for the CAC latches. The lowermost of three AND gates has an output we will call "AND Gate For Acc 3". One of these inputs is the timing signal GF5 which distinguishes accumulator 3 from the other accumulators and as already explained, this signal comes up for one G time in every six G times. Specifically, it comes up at the G time that is designated "GF5." The inputs from the CAC latches are defined by a binary number 010 and when CAC latches are at this count position, the AND gate for accumulator 3 is enabled and the other two accumulators are disabled. Thus, the CAC latches remain set to enable this gate while twenty GF5 pulses appear. The other input to the gate from latch Acc 3 is controlled by program flags so that even though the timing is right for adding into a particular accumulator an Add operation will not take place unless the accumulate 1, 2, 3 latch is set from the flags. The latches Acc 1, 2, 3 have an input buffer F/B OUT which is the buffer that holds the flags for this operation. The signal Acc scan is part of the timing sequence that is shown in FIGS. 5A and B and will be described later. The times B1, B2 and B3 define the outputs in buffer F/B that relate to a particular accumulator. Thus, a one bit at time B1 in buffer F/B signifies that accumulator 1 is to accumulate the corresponding column from buffer B of the machine. Thus, any combination of latches Acc 1, 2, 3 can be set or reset. Reset occurs on the OR of various inputs, most of which are shown in FIGS. 5A and B.

FIGS. 5A and B show the logic for transferring data between the B buffer in the base machine and the accumulate buffers. In the upper left hand corner, the line "data transfer LTH" signifies that the base machine has started transferring data from the A buffer to the B buffer. This operation sets the latch 37 Acc Scan Control." This latch is reset on the coincidence of 80/1, 64 and Acc scan signals. The occurrence of the 80/1 and G4 signals signifies that the B buffer is in column 80. Thus, latch Acc scan control comes on at the beginning of the operation described on this page and turns off only when the operation has been completed. Acc scan control enables the setting of a latch Acc scan. This latch is going to turn on just before the beginning of a buffer B cycle (80/1 G5, B5) and it will turn off at the buffer scan when the next column in buffer B has been found and read out as is signified by the turn on of the latch Acc gate. Thus, Acc scan turns on at the beginning of the buffer scan and its output enables the AND gate to the right to set the latch "Acc gate" when a flag appears at the output of buffer F/B at time B5. These flags are placed in buffer F/B at the transfer time of data from buffer A to buffer B.

B5 time in buffer F/B is a flag identifying the next column to be read from buffer B and this flag would be erased when it is detected. When Acc gate is set it turns off Acc scan and thus prevents the circuit from responding to or erasing subsequent flags in buffer F/B. When "Acc gate " comes on it enables an AND gate to set a latch "C-Gate" at time G4, B2. Time G4, B2 is the first of the ten numeric positions of the 12-bit Hollerith code. (The first two positions, G4,B0 and G4,B1 are for non-numerics). This means that B0 which is called a twelve punch and B1 which is called an eleven punch are blanked out in this operation and any letters that are in the field will be converted to numbers. Once C gate turns on, T2 pulses are entered into the low order stage of counter C. C gate stays set until the first one logic level bit at the output of buffer B and at this time it is reset. The count in counter C is the binary of the Hollerith number read from buffer B and because it is a four-bit group it is also a BCD number. This operation can be understood by recognizing that a zero is represented by a punch in row 0 and correspondingly by a 1-bit in time G4,B2 of the buffer. If a one-bit occurs at this time, the C counter remains at zero. A binary "1" is represented by a punch in row 1 of the punched card and by a one logic level signal at time G4,B3 and such a load would allow the counter stage to remain at one.

Figure 4B:
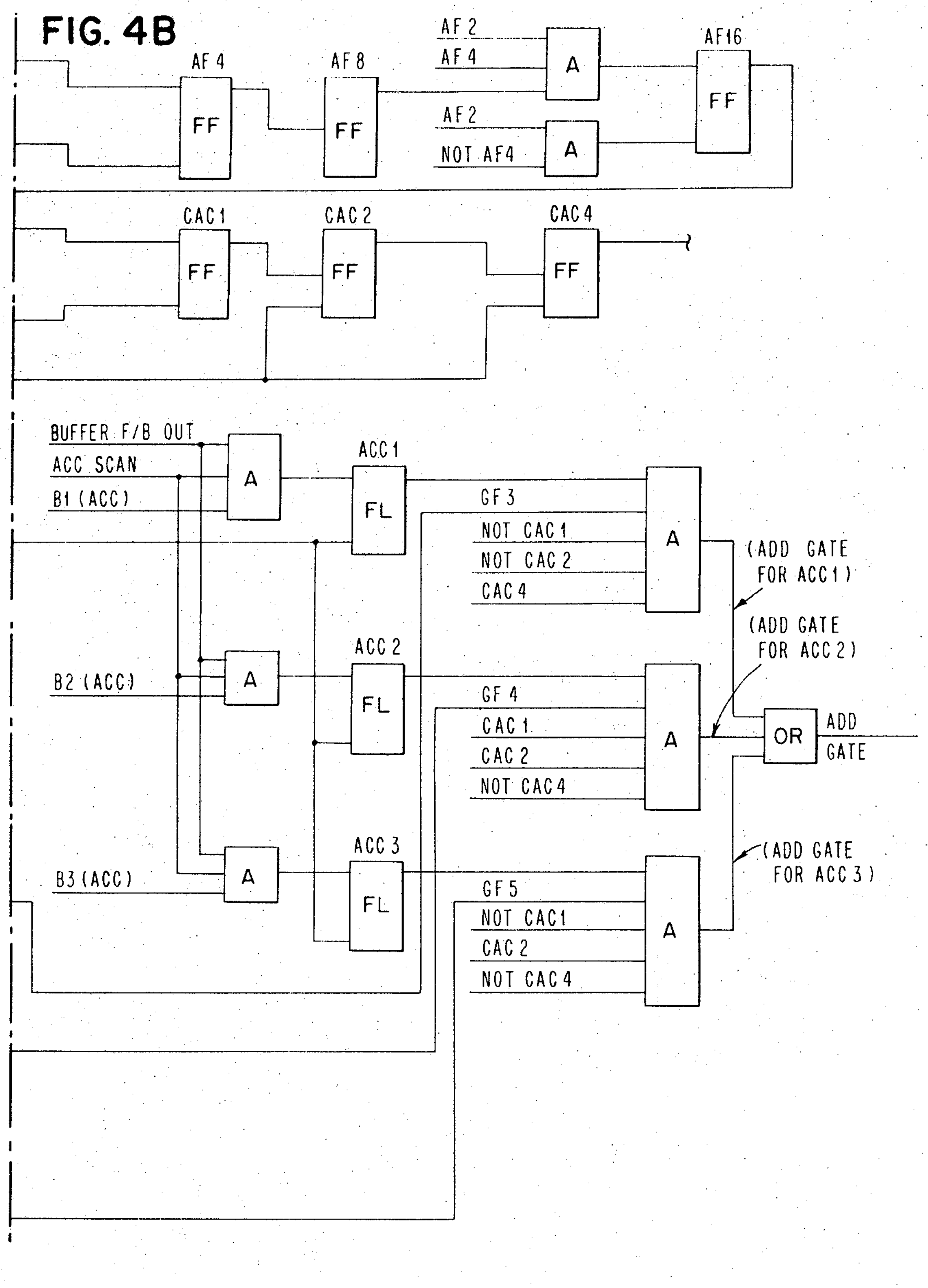

This 4-bit group in counter C is transferred to register A in parallel. The X in the vertical line between counter C and counter A represents a system of gates for doing this. The AND gate that controls this gate has inputs Acc gate which have just been described. Not C gate means that the C gate has been reset at the end of the count for the binary number. G5,B5 signifies that the character in the B buffer has been completely read since B5,G5 is the last of the 36 bit positions for a column in buffer B. The BCD group stays in register A for the time being. When Acc gate is set, as already explained for loading counter C, it enables the setting of a latch called "Acc data transfer." This latch enables setting of latch "REG A/Acc zero" at the fall of AF16 and resetting it at the next fall of AF16. When "REG A/Acc zero" is set, it energizes the output arrowed toward the bottom of the drawing after the last entry to Acc 4 from buffer B sets the Add/Subtract latch shown in FIGS. 4A and 4B and thereby starts the CAC clock running. When "REG A/Acc zero" is set at GF0 time, "REG A/Acc zero" also brings up a line "A-gate" to transmit GF pulses until AF16 has fallen. "A-gate"enables the next AND gate circuit in the sequence to transmit narrow pulses at the fall of T2 for bit times B2, 3, 4 and 5 to shift register A for reading it serially from the low order position. At the same time, "A-gate" enables the circuit shown to transmit from register A to adder B to buffer J, and from buffer J via adder A to register A. Adder B does not modify the data because there is no previous add operation to have set the carry B latch or the register A greater than the 9 latch.

When "REG A/Acc zero" sets it resets the Acc data transfer latch and this latch conditions one of the inputs to Acc scan latch to start the next scan. In the search for flags in buffer F/B to set Acc gate, the latch Acc scan is kept on longer in each cycle of the buffer scan. At some point the scan will expand into column 80 of the buffer because no flag will have been found in any of the preceding 79 columns. At this point, as already explained, the coincidence of column 80-1 and Acc scan resets Acc scan control which prevents Acc scan from turning on again.

The logic for gating register A into buffer J at the appropriate time slots has been partially described. Acc gate comes up for the purpose of loading accumulator zero in response to the output of "REG A/Acc zero," Not AF/16, and GF0. GF0 is generated from the AC1, AC2, AC4 clock as shown in FIGS. 4A and B independently of the CAC counters.

Referring back to FIG. 2, when data is to be read back into buffer B from buffer J, the clock running buffer J is stopped while buffer J continues to shift. The length of the stop is the length of the field to be written into buffer B. As a result of this, the first digit to be transferred from buffer J to buffer B will be the highest order position of the field and transfer then proceeds from higher order position to lower order position. At the end of the field transfer, buffer J and the clock will be back in digit synchronism.

Therefore, while the invention has been shown and described with respect to the preferred embodiment thereof, it will be understood by those skilled in the art that various changes in form and detail may be made therein without departing from the spirit and scope of the invention.

What is claimed is:

1. In a key entry device having a first serial buffer for recording data signals representative of keyboard entries, a second serial buffer for controlling the recording of data on a media and means for controlling the transfer of data signals from the first buffer to the second buffer, an accumulator for summing the data signals representative of a keyed numeric field with data signals representative of a stored total, comprising:

conversion means coupled to the second buffer for converting the keyed numeric data signals from the second buffer and the stored total data signals from the accumulator between a Hollerith code used in the keying of the data into the key entry device and BCD used by the accumulator in performing computations so as to permit transfer of data signals between the accumulator and the second buffer;

a third buffer means having a single shift register for storing BCD bits in at least two serial sections one serial section for storing the keyed numeric field data signals and at least one other serial section for retaining the stored total data signals that are to be summed with the keyed numeric field data signals so that the keyed numeric field data signals and the stored total signals appear at the output of the shift register at different times;

a first single position register means coupled to the output of the shift register for receiving from the shift register and storing the BCD bits of one position of the keyed numeric field data signals; and a first single place adder means coupled to the output of the shift register and the output of the first single position register for performing summing operations on the keyed numeric field data signals and the stored total data signals a digit of each BCD number at a time when that digit of the stored total data signal appears at the output of the shift register.

2. The accumulator of claim 1 including:

a second single position register means coupled to the conversion means and to the first single place adders to receive and transmit data to the converter and to receive data from the first single place adder;

a second single place adder coupled to the second single place register for receipt of the output signals of the conversion means and of the first single place adders and converting the output signals of the first single place adder from binary to BCD; and means coupling the output of the second single place adder to the input of the shift register for placing the output signals of the second single place adder into the serial register whereby the stored total signals may be placed into the second buffer for recording on a media in the Hollerith code and keyed numeric field signals and the stored total signals may be stored in the serial register in BCD.

* * * * *